United States Patent
Halberstadt

(10) Patent No.: US 7,397,229 B2
(45) Date of Patent: Jul. 8, 2008

(54) SWITCH MODE POWER CIRCUIT

(75) Inventor: Johan Christiaan Halberstadt, Nijmegen (NL)

(73) Assignee: NXP B.V., Eindhoven (NL)

(*) Notice: Subject to any disclaimer, the term of this patent is extended or adjusted under 35 U.S.C. 154(b) by 254 days.

(21) Appl. No.: 10/561,310

(22) PCT Filed: Jun. 16, 2004

(86) PCT No.: PCT/IB2004/050920

§ 371 (c)(1),
(2), (4) Date: Dec. 19, 2005

(87) PCT Pub. No.: WO2004/112230

PCT Pub. Date: Dec. 23, 2004

(65) Prior Publication Data

US 2006/0197514 A1    Sep. 7, 2006

(30) Foreign Application Priority Data

Jun. 19, 2003 (EP) .................................. 03101813

(51) Int. Cl.
*G05F 1/00* (2006.01)
(52) U.S. Cl. ...................... 323/284; 323/290; 324/416; 324/418
(58) Field of Classification Search ................. 323/239, 323/290, 248, 249, 280, 284; 324/415–424; 307/112

See application file for complete search history.

(56) References Cited

U.S. PATENT DOCUMENTS

| | | | | |
|---|---|---|---|---|
| 4,482,866 A | * | 11/1984 | Crooks | 330/149 |
| 5,617,306 A | * | 4/1997 | Lai et al. | 363/17 |
| 5,631,816 A | * | 5/1997 | Brakus | 363/97 |
| 5,646,491 A | * | 7/1997 | Erdman et al. | 318/254 |
| 5,726,869 A | * | 3/1998 | Yamashita et al. | 363/21.06 |
| 6,069,804 A | | 5/2000 | Ingman et al. | |
| 6,130,828 A | * | 10/2000 | Rozman | 363/21.06 |
| 6,252,784 B1 | * | 6/2001 | Dobrenko | 363/21.12 |
| 6,304,472 B1 | * | 10/2001 | Nagasu et al. | 363/97 |
| 6,433,491 B2 | | 8/2002 | Halberstadt | |
| 6,771,059 B1 | * | 8/2004 | Zwicker | 324/119 |

\* cited by examiner

*Primary Examiner*—Jessica Han
*Assistant Examiner*—Emily Pham
(74) *Attorney, Agent, or Firm*—Peter Zawilski

(57) ABSTRACT

There is provided a switch mode power supply circuit including at least one inductive component coupled to an associated switching device for cyclically connecting the inductive component to a source of power. The circuit includes a signal output representative of a voltage at a junction of the at least one inductive component to the switching device. The circuit further comprises a hard switching amplitude detector for deriving a measure of hard switching amplitude occurring in operation in the switching device the detector including a signal processing path for receiving the signal output and generating the measure of hard switching amplitude therefrom. The signal path includes: a signal differentiator for imperfectly differentiating the signal output to generate a corresponding imperfectly differentiated signal; and a signal integrator for integrating the imperfectly differentiated signal in a temporally-gated manner for generating the measure of hard switching.

13 Claims, 6 Drawing Sheets

SWITCH MODE POWER CIRCUIT

FIELD OF THE INVENTION

The present invention relates to switch mode power circuits, for example to switch mode motor controllers and to switch mode power supplies; in particular, but not exclusively, the invention relates to a switch mode power circuit including features for detecting hard switching amplitude therein. Moreover, the invention also relates to a method of detecting hard switching amplitude of a hard switch moment in switch mode power circuits, for example a method of detecting hard switching amplitude in switch mode power supplies.

BACKGROUND TO THE INVENTION

Switching mode power circuits are well known, for example switch mode power supplies and switch mode motor controllers. Such circuits usually include one or more electronic power switching devices, for example a field effect transistor (FET), a bipolar switching transistor, a triac and/or a silicon controlled rectifier (SCR). Increasingly, on account of their relatively faster switching speed enabling coincidental use of more compact magnetic components such as ferrite transformers, FETs are becoming increasingly employed in switch mode power circuits.

An important parameter for consideration when designing switch mode power circuits is hard switching amplitude; hard switching amplitude is defined as a voltage developed across a switching device at a moment whereat the device is driven into a conductive state, namely turned on.

U.S. Pat. No. 6,069,804 describes a multi-output, multi-directional power converter that has an input bi-directional switch and at least a first output bi-directional switch. Moreover, the converter further comprises a coupled inductor having an input winding and at least one output winding. The input winding is connected in series with an input voltage source and an input bi-directional switch implemented using FET technology. Each coupled inductor output winding is connected in series with a corresponding output voltage source, for example a capacitor, and its respective output bi-direction switch also implemented using FET technology. The converter additionally includes a clock circuit for providing first and second control signals, each signal having first and second states. The first and second signals are connected to the input and output switches respectively. Moreover, the first and second signals are arranged to be substantially mutually complementary with regard to their states.

The power converter is susceptible to being modified to include resonant transition controlling means for sensing currents in the input and output windings as well as output voltage and from such current sensing together with a measure of output voltage from the converter for adjusting a clocking frequency of the converter for enabling the converter to function in a resonant mode.

The converter is potentially expensive to implement on account of its clock circuit being coupled to both input and output sides of the coupled inductor, such connection requiring additional coupling transformers to be included for controlling the switches. Moreover, the converter does not utilize hard switching amplitude information as an aspect of its operation.

U.S. Pat. No. 6,433,491 describes a method of generating a signal corresponding to hard switching amplitude. The method concerns the use of a capacitive divider for sensing primary winding potential in a transformer-coupled device. The method involves temporally controlled resetting of the divider in conjunction with a sample-and-hold circuit for providing a direct indication of the hard switching magnitude. However, the method requires precise timing information and is directly associated with the primary winding which is potentially at relatively high potentials, for example as in mains-supplied SMPS. Thus, this U.S. patent is regarded as elucidating a non-optimal method of determining hard switching amplitude.

The inventor has appreciated that it is desirable, for example not only in the aforementioned method but also in the power controller and other similar types of switch mode circuits such as switch mode power supplies, to measure hard switching amplitude. For example, in a switch mode power supply (SMPS) system, switching losses occur if one or more power controlling switching devices therein are turned on, namely driven to a conductive state, whilst a non-zero potential is developed there across.

In some SMPS applications, hard switching is unavoidable and the hard switching amplitude is variable, for example in response to changing SMPS loading conditions. In such circumstances, it is often desirable to provide regulation to other components depending upon this amplitude, for example for providing circuit protection shutdown in an event of circuit overload. Moreover, timing information pertaining to occurrence of such hard switching is often not available or relatively expensive to obtain, for example on account of a need to include additional isolation components where mains electrical input supplies are involved. An example of such a SMPS application is a bi-directional flyback converter including a transformer with primary and secondary windings, the primary winding being connected to a primary FET switching device; preferably, the primary device is turned on, namely switched to a conducting state, whilst a voltage developed there across is almost of zero magnitude, namely the primary device is preferably subject to soft switching. There thereby arises a need to monitor the hard switching amplitude of the FET device, such monitoring conventionally being achieved by including a control loop implemented substantially around circuits associated with the secondary windings. Thus, the hard switching amplitude is conventionally monitored at a secondary region of the bi-directional converter by monitoring a voltage developed across one of its transformer windings. In such a configuration, precise switching timing information pertaining to the primary windings is not normally available at the secondary circuit unless additional potentially expensive components are included.

The inventor has appreciated that it is especially desirable to be able to determine hard switching amplitude in switch mode circuits including transformer-type components by monitoring a signal developed across a secondary winding of such transformer-type components without there being a need to generate precise temporal information, thereby potentially reducing the cost and complexity of such switch mode circuits.

SUMMARY OF THE INVENTION

It is an object of the invention to provide an improved switched mode power supply. The invention is defined by the independent claims. The dependent claims define advantageous embodiments.

The invention is of advantage in that the circuit is capable of yielding the measure of hard switching amplitude in a manner that is at least one of less expensive, less complex, and more accurate in comparison to conventional approaches to determining such a measure of hard switching amplitude.

Preferably, the detector further includes timing means for applying temporal gating to the integrating means. The timing means is of benefit in that it enables a particular portion of the signal output more significantly influenced in response to changes in hard switching amplitude to be selected for purposes of generating the measure of hard switching amplitude.

More preferably, the timing means is also arranged to provide temporal gating to the differentiating means. Such additional temporal gating of the differentiating means is capable of improving accuracy of the detector when generating its measure of hard switching amplitude.

Preferably, in order to provide an nearly instantaneous and potentially more accurate measure of the hard switching amplitude, the timing means is arranged to reset at least one of the differentiating means and the integrating means for each conduction cycle of the switching means. Such resetting is capable of enabling the circuit to generate the measure of hard switching amplitude that is substantially instantaneously updated.

Preferably, for example to reduce circuit cost and complexity as well as providing electrical isolation in a straightforward manner, the differentiating means is implemented as a potential divider combination of a resistor and an associated capacitor, the resistor and capacitor defining an associated time constant capable of rendering the combination susceptible to providing imperfect differentiation of the signal output suitable for use in generating the measure of hard switching amplitude.

Preferably, the circuit is susceptible for use in at least one of: switch mode power supplies, motor controllers, battery chargers, ionizing apparatus, high-tension bias generators. The measure of hard switching amplitude is susceptible to being used for one or more of feedback regulation, overload protection and power monitoring.

It will be appreciated that features of the invention are susceptible to being combined in any combination without departing from the scope of the invention.

DESCRIPTION OF THE DIAGRAMS

Embodiments of the invention will now be described, by way of example only, wherein.

DESCRIPTION OF EMBODIMENTS OF THE INVENTION

In order to elucidate the present invention, a conventional approach to measure hard switching amplitude will firstly be described in detail followed by a description of embodiments of the present invention in order to juxtapose the present invention more clearly with respect to the prior art.

Figure 1:
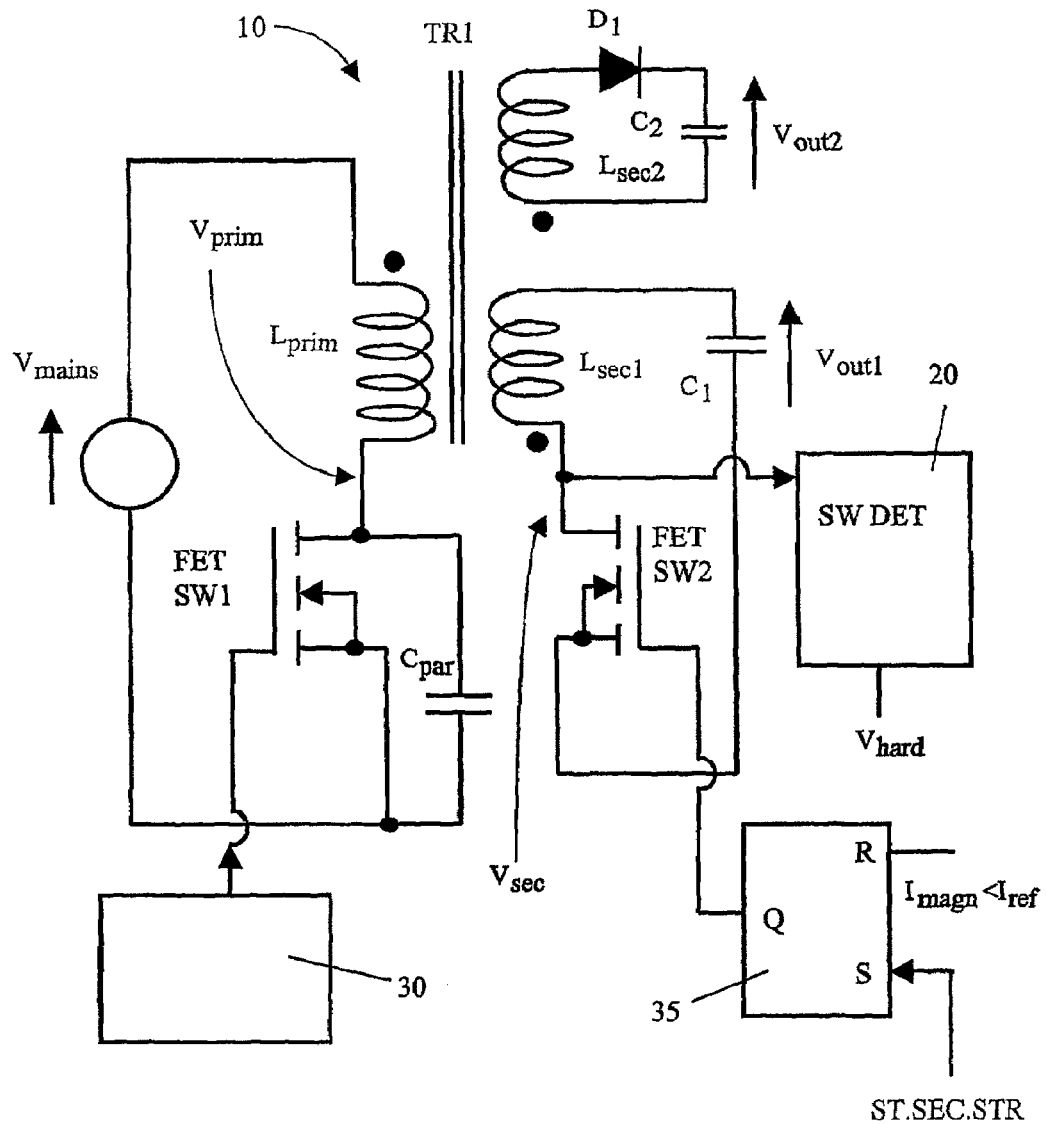
FIG. 1 is a schematic diagram of a known switch mode power supply (SMPS) implemented as a bidifly converter.

In FIG. 1, there is shown a schematic diagram of a conventional switch mode power supply (SMPS) implemented as a bi-directional fly-back converter, known often as a bidifly converter; the supply is indicated generally by 10. The supply 10 comprises a ferrite-cored transformer TRI comprising a primary winding $L_{prim}$, and first and second secondary windings $L_{sec1}$, $L_{sec2}$ respectively. The primary winding $L_{prim}$ is electrically isolated from the secondary windings $L_{sec1}$, $L_{sec2}$. Moreover, the primary winding $L_{prim}$ is connected in series with a primary field effect transistor switch FET SW1 and mains electrical supply $V_{mains}$. The mains supply $V_{mains}$ is susceptible, for example, to being provided from an alternating mains supply by way of a suitable high-voltage bridge rectifier coupled to electrolytic storage capacitors (not shown).

The primary switch FET SW1 includes a parasitic drain-source capacitance $C_{par}$ as a consequence of its mode of fabrication. A gate electrode of the primary switch FET SW1 is coupled to a primary drive circuit 30.

The second secondary winding $L_{sec2}$ is coupled via a rectifier diode $D_1$ to a capacitor $C_2$ across which, in operation, a voltage difference $V_{out2}$ is generated. Similarly, the first secondary winding is connected in series with a capacitor $C_1$ and a secondary field effect transistor switch FET SW2 as shown; in operation, a voltage difference $V_{out1}$ is developed across the capacitor $C_1$. An output junction whereat the primary winding $L_{prim}$ is coupled to the primary switch FET SW1 defines a voltage difference $Vp_{rim}$ as illustrated. Likewise, an output junction whereat the first secondary winding $L_{sec1}$ is connected to the secondary switch FET SW2 defines an output voltage $V_{sec}$ which is coupled to a hard switching amplitude detector (SW DET) 20; the switching detector 20 includes, amongst other components, a sample-and-hold circuit whose operation is susceptible to being precisely time gated. The secondary switch FET SW2 is driven from a Q output of a flip-flop 35 whose reset input R is coupled to a circuit (not shown) operable to switch the switch FET SW2 to a non-conducting off state when a magnetizing current $I_{magn}$ is less than a reference current $I_{ref}$; the current $I_{magn}$ is defined later. Moreover, the flip-flop 35 includes a set input S coupled to a start secondary stroke (ST. SEC. STR.) line for causing the secondary switch FET SW2 to conduct in an on state when this line assumes a logic 1 state.

Figure 2:
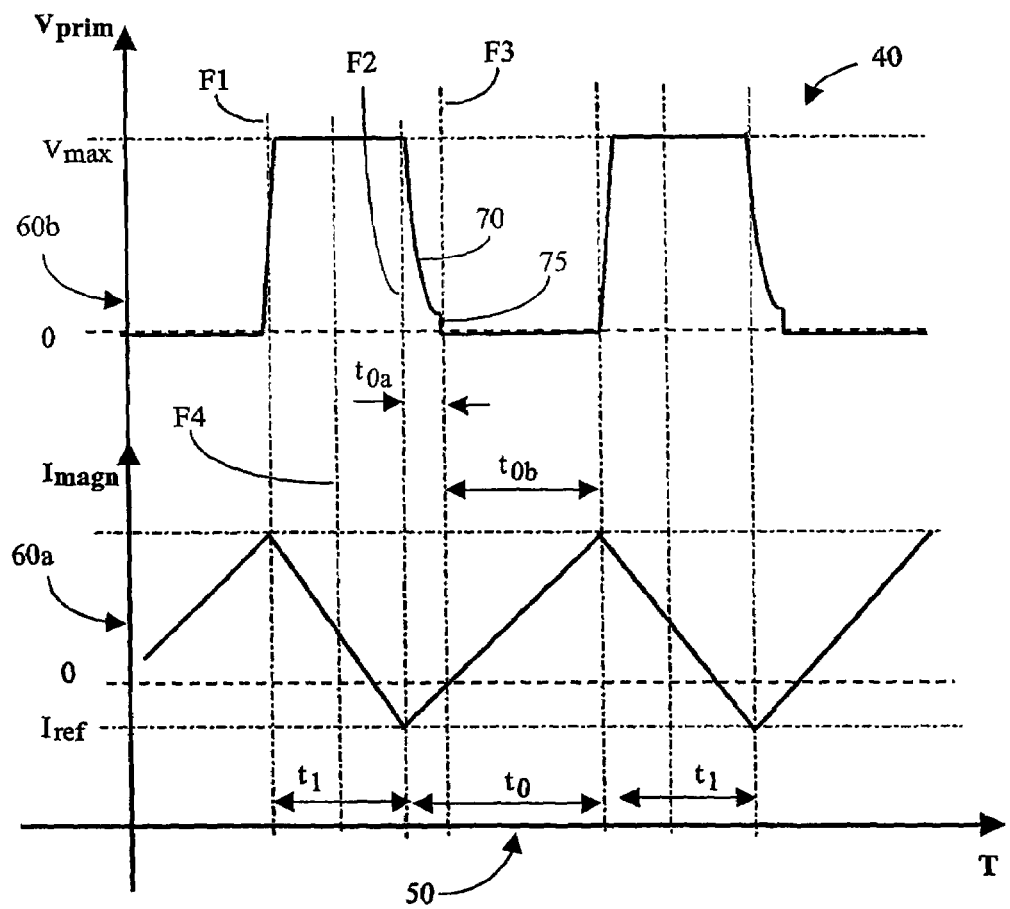
FIG. 2 is a graph illustrating operation of the supply of FIG. 1.

Referring to FIG. 2, there is shown a temporal graph indicated generally by 40, the graph 40 pertaining to operation of the supply 10. The graph 40 comprises an abscissa axis 50 denoting time T. Moreover, the graph 40 further comprises a first ordinate axis 60a denoting magnetizing current $I_{magn}$ corresponding to a summation of currents flowing in all windings of the transformer TR1 referred to a primary side thereof, such referral taking into account turns ration of the primary and secondary windings $L_{prim}$, $L_{sec1}$, $L_{sec2}$. Furthermore, the graph 40 additionally comprises a second ordinate axis 60b denoting the voltage difference $V_{prim}$ as indicated in FIG. 1, namely a potential at a junction where the primary switch PET SW1 is coupled to the primary winding $L_{prim}$.

Operation of the supply 10 will now be described in overview with reference to FIGS. 1 and 2. During a time period $t_{0b}$ in the graph 40, namely during a latter part of a time period $t_0$ in which a magnetizing current through the primary winding $L_{prim}$ is increasing, the primary switch FET SW1 is in a conducting state causing the voltage $V_{prim}$ to be substantially close to zero across the switch FET SW1. The magnetizing current through the primary winding $L_{prim}$ increases from substantially zero magnitude during this period $t_{0b}$ as illustrated relative to the ordinate axis 60a. In contradistinction, during a time period $t_1$ in the graph 40, the summated magnetizing current $I_{magn}$ decreases progressively to finally a value $I_{ref}$ as illustrated. During the period $t_{0a}$, the voltage $V_{prim}$ exhibits a progressive decay 70 caused by resonant ringing arising on account of there being created a resonant circuit comprising the parasitic capacitance $C_{par}$ of the primary switch FET SW1 and the inductance of the primary winding $L_{prim}$. The progressive decay 70 is followed by a sharp decay denoted by 75 indicative of hard switching occurring in the FET SW1. In FIG. 2, instances F1, F2, F3, F4 correspond to:

(a) F1: switch-off of the primary switch FET SW1;
(b) F2: switch-off of the secondary switch FET SW2;
(c) F3: switch on of the primary switch FET SW1; and
(d) F4: switch-on of the secondary switch FET SW2.

During the period $t_{ob}$, current through the primary winding $L_{prim}$ establishes a magnetic field in the transformer TR1, the field subsequently decaying again in its subsequent period $t_1$. The secondary switch FET SW2 is driven by its associated flip-flop to conduct to transfer magnetic energy stored within the transformer TR1 to the capacitor $C_1$. The supply 10 exploits a useful characteristic in that a negative value of $I_{magn}$ charges the capacitor $C_{par}$ at the end of the period $t_1$ with a consequence that the primary switch FET SW1 is switched to a conductive state with a relatively low potential there across, thereby reducing switching losses arising in operation in the supply 10. Preferably, the magnitude of a reference current $I_{ref}$ is controlled by a potential $V_{hard}$ indicative of the hard switching amplitude at switch-on of the primary switch FET SW1. On account of a need for mains isolation between the primary winding $L_{prim}$ relative to the windings $L_{sec1}$, $L_{sec2}$, it is conventional practice to determine the hard switching amplitude $V_{hard}$ at one or more of the secondary windings $L_{sec1}$, $L_{sec2}$. However, conventional approaches to determining the hard switching amplitude at the secondary windings have hitherto been one or more of inconveniently expensive and insufficiently accurate. The inventor has therefore appreciated that an improved method of measuring hard switching amplitude at secondary windings $L_{sec1}$, $L_{sec2}$ is potentially of advantage.

In a conventional bidifly-type converter, the inventor has appreciated that it is desirable to discriminate between ringing that occurs after switch-on of the primary switch FET SW1 from a steep slope, for example as represented by 70 in FIG. 2, arising at an instance the primary switch FET SW1 is driven to its conducting state, for example as represented by 75 in FIG. 2. In order to provide such discrimination, it would be conventionally anticipated that precise timing signals would need to be provided within the supply 10. As timing signals associated with the primary switch FET SW1 are available in the supply 10, these signals are beneficially employed for measuring the hard switching amplitude and have been previously investigated by the inventor in the context of televisions and related visual monitor units.

The inventor has appreciated that an original signal can be temporally differentiated to provide a corresponded differentiated signal. Moreover, the inventor has also envisaged that the original signal is susceptible to be regenerated by applying integration to the differentiated signal. Indeed, the inventor has appreciated that a part of the differentiated signal is also susceptible to be integrated to substantially regenerate a corresponding portion of the original signal. For example, in the supply 10, the voltage $V_{prim}$, or a corresponding version thereof available at one or more of the secondary windings $L_{sec1}$, $L_{sec2}$, is susceptible to being differentiated to provide a corresponding differentiated signal $dV_{prim}/dt$, wherein a measure of a current flowing through the capacitor $C_{par}$ can thereby be derived. The current flowing through the capacitor $C_{par}$ is substantially equal to the current flowing though the primary winding $L_{prim}$ during trailing and leading edges of each conduction cycle, namely stroke, of the primary switch FET SW1. Thus, by integrating the differentiated signal $dV_{prim}/dt$ using an integrator, it is feasible to recreate a measure of the voltage $V_{prim}$. In a situation where an ideal differentiator is employed to generate the signal $dV_{prim}/dt$, the differentiator only generates a useful signal during a time where relatively rapid change in the voltage $V_{prim}$ occurs in the supply 10.

The inventor has appreciated that, for purposes of controlling operation of the supply 10, it is desirable to measure the voltage over the capacitor $C_{par}$ especially when the primary switch FET SW1 is switching on to its conducting state corresponding to the progressive decay 70 in FIG. 2. The decay 70 is of a temporal duration including discharging of the capacitor $C_{par}$. In practice, this temporal duration is in the order of 10 ns. Generating precise timing signals for such relatively short durations is potentially a problem.

Figure 3:
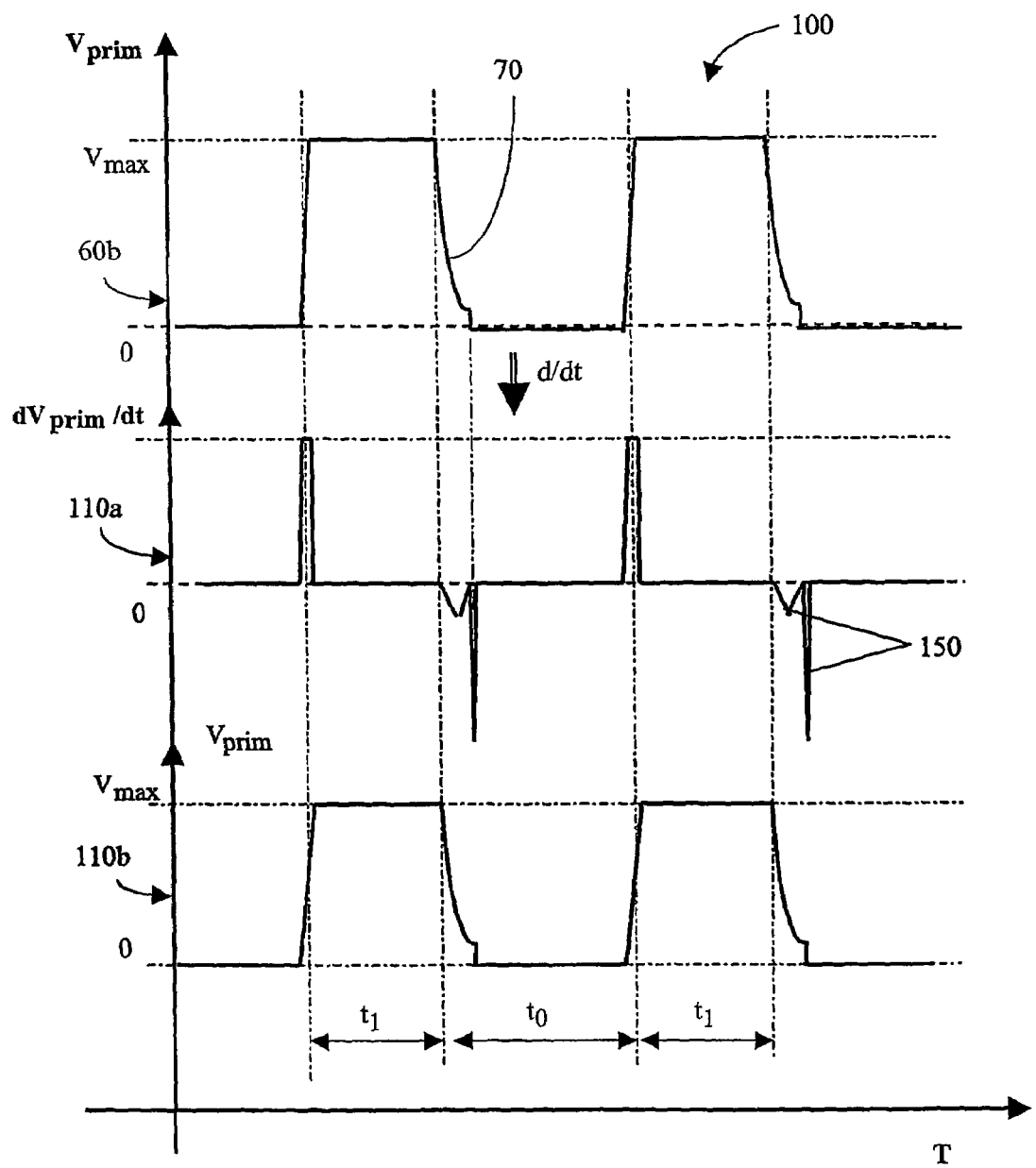
FIG. 3 is a graph illustrating temporal differentiation followed by temporal integration for recreating a potential arising in operation at a primary switch of the supply of FIG. 1.

Referring to FIG. 3, there is shown a graph indicated generally by 100 in which the voltage $V_{prim}$ developed at the primary winding $L_{prim}$ is shown against the ordinate axis 60b in a similar manner to FIG. 2. Moreover, against an ordinate axis 110a, there is shown a temporally differential version of the voltage $V_{prim}$, namely a signal $dV_{prim}/dt$. It will be appreciated from FIG. 3 that the signal $dV_{prim}/dt$ is susceptible to being integrated to recreate the signal $V_{prim}$ as illustrated against an ordinate axis 110b.

The inventor has appreciated that an area under differential peaks 150 corresponding to switch-on of the primary switch FET SW1 is of interest. Moreover, for hard switching amplitude control purposes, the inventor has also identified that it is desirable to regenerate the voltage $V_{prim}$ from an instance in each cycle whereat hard switching commences. Thus, if a non-ideal differentiator were employed, an area under the peaks 150 becomes effectively distributed over a relatively longer time period. An output from such a non-ideal differentiator is susceptible to being integrated wherein a leading hard switching peak 150 can be used as a timing signal for commencing integration. Preferably, a time constant for the differentiator is chosen to be relatively large and integration is beneficially completed before a subsequent conduction cycle, namely stroke, of the primary switch FET SW1 occurs. More preferably, the differentiator is implemented using a network comprising a resistor $R_d$ connected to an associated capacitor $C_d$ whose time constant $\tau = R_d C_d$ is 25% or less of the time interval $t_0$ shown in FIG. 2. Optionally, the signal $V_{prim}$ provided to the differentiator is susceptible to being suppressed for a period longer then the time $t_0$ to allow for longer integration times to be employed.

Figure 4:
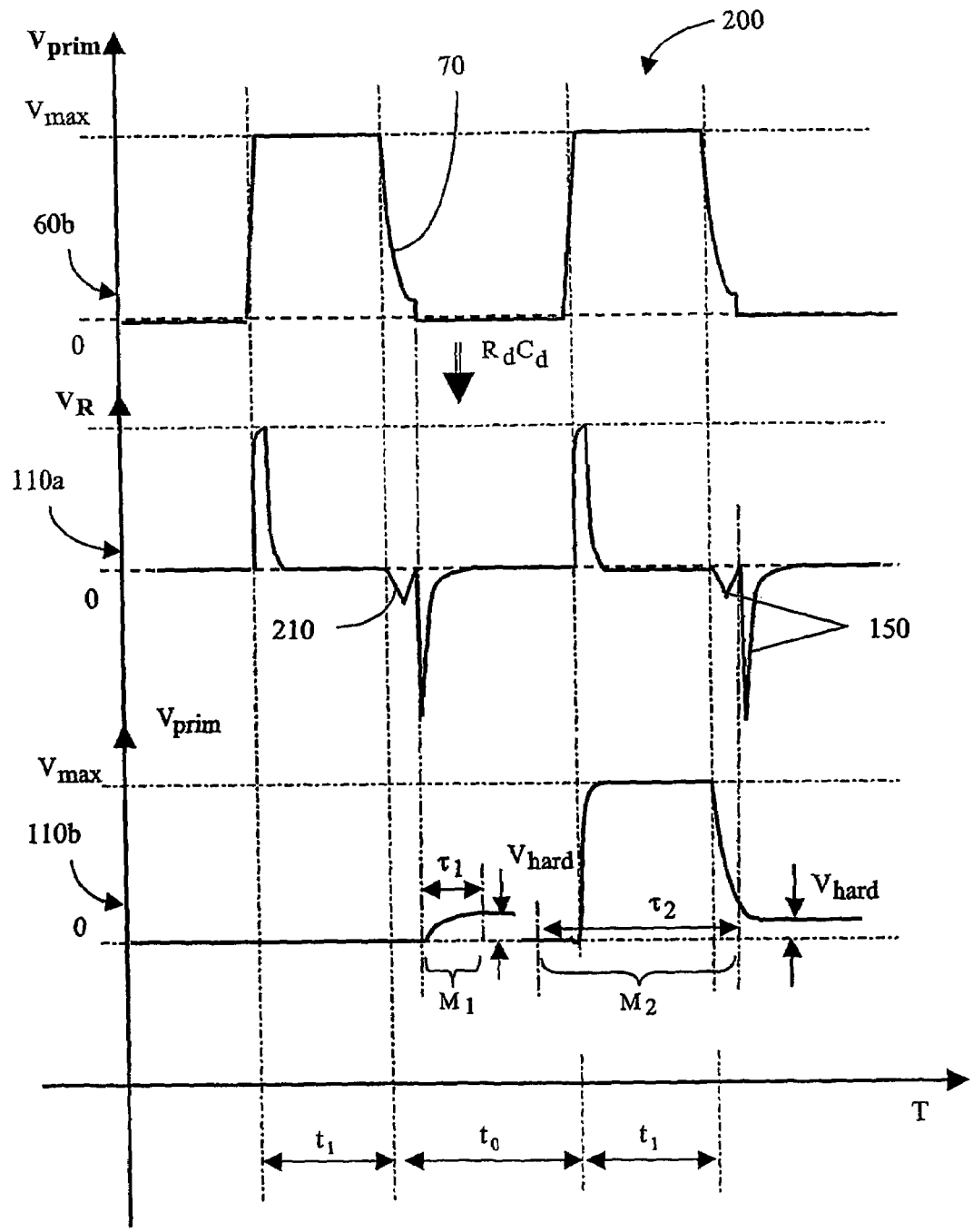
FIG. 4 is a graph illustrating imperfect differentiation followed by temporally gated integration to derive a measure of hard switching amplitude, $V_{hard}$.

Thus, there arise first and second methods M1, M2 for deriving an indication of hard switching amplitude in the supply 10 using an imperfect differentiator coupled in series with a temporally-gated integrator for processing an input signal corresponding to the voltage $V_{prim}$. These two methods are schematically illustrated in FIG. 4 wherein is included a graph indicated by 200.

In the first method M1, the voltage $V_{prim}$ arising at the primary switch FET SW1 is coupled through an imperfect $R_d$ $C_d$ differentiator as described in the foregoing to an integrator which is temporally gated for a period $\tau_1$ as illustrated, wherein the presence of a first peak 210 is used for timing control/synchronization for the period $\tau_1$. An output of the integrator at the end of the period $\tau_1$ is then indicative of hard switching amplitude $V_{hard}$ arising in the primary switch PET SW1. In the first method M1, it is necessary to commence integration without earlier history of the differentiator output; preferably therefore, immediately prior to the period $\tau_1$, the resistance $R_d$ of the differentiator is preferably shorted across its terminals, for example by using an analog FET switch as will be described in more detail later, for resetting purposes.

In the second method M2, the voltage $V_{prim}$ arising at the primary switch FET SW1 is coupled through the imperfect $R_d$ $C_d$ differentiator to the aforementioned integrator, which is temporally gated for a period $\tau_2$ as illustrated. The period $\tau_2$ encompasses a switch-off transition of the primary switch FET SW1 but is disabled with regard to its subsequent hard switch-on transition and additional time there around rendering integrator gate timing for the second method less critical; preferably the period $\tau_2$ includes a complete conduction cycle excluding an initial hard switching period. An output of the integrator at the end of the period $\tau_2$ is indicative of hard switching amplitude, $V_{hard}$.

Figure 5:
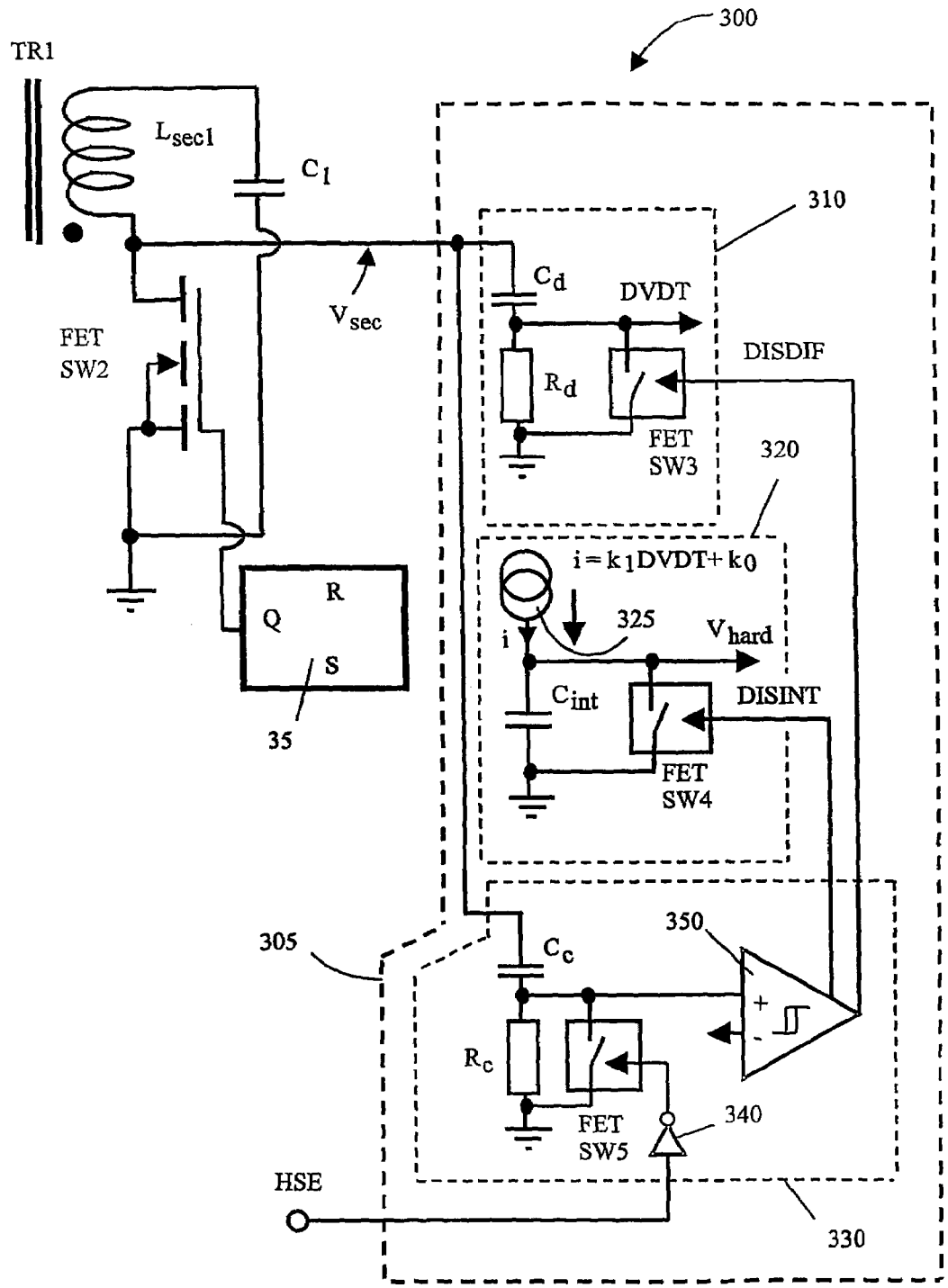
FIG. 5 is a schematic diagram of a first embodiment of the invention.

In order to further elucidate the invention, an embodiment thereof will now be described with reference to FIG. 5. In FIG. 5, there is shown the supply including its transformer TR1 with its first secondary winding $L_{sec1}$ together with the aforementioned capacitor $C_1$, its secondary switch FET SW2 coupled to its corresponding flip-flop 35. The supply in FIG. 5 is also providing with a hard switching amplitude detector indicated generally by 300 and included within a dashed line 305. The detector 300 comprises an imperfect differentiator 310, a temporally-gate integrator 320 and a control unit 330 for providing temporal gating signals DISDIF, DISINT to the differentiator 310 and to the integrator 320 respectively. An output signal line $V_{hard}$ from the integrator 320 is arranged to provide a measure of hard switching amplitude arising in the primary switch FET SW1 during operation. The signals DISDIF, DISINT are arranged to be capable of resetting the differentiator 310 and the integrator 320 respectively. Moreover, the control unit 330 is provided with an input signal line HSE for receiving a signal generally indicative of a time interval in which hard switch is expected but not temporally exact in contradistinction to the prior art.

The differentiator 310 comprises a capacitor $C_d$ including first and second terminals. The first terminal is to the junction of the secondary switch FET SW2 and the first secondary winding $L_{sec1}$ as illustrated. The second terminal of the capacitor $C_d$ is coupled to a first terminal of a resistor $R_d$ and to a first switch terminal of a FET switch FET SW3. A second terminal of the resistor $R_d$ and a second switch terminal of the switch FET SW3 are both coupled to a signal ground. At the second terminal of the capacitor $C_d$, there is provided an imperfect differential signal output designated DVDT. A control input of the switch FET SW3 is connected to a signal line DISDIF for disabling the differentiator 310. Temporal switching of the differentiator 310 will be described in more detail later. The differentiator 310 is operable to provide a transfer function describable in Laplacian form of Equation 1 (Eq. 1):

$$DVDT = \left[\frac{sR_dC_d}{(1+sR_dC_d)}\right]V_{sec} \qquad \text{Eq. 1}$$

where s if the Laplacian operator.

The integrator 320 includes a current source 325 whose output current i is linearly related to the signal DVDT by a proportionality constant $k_1$. An output of the source 325 is connected to a first terminal of an integration capacitor $C_{int}$ and to a first switch terminal of a FET switch FET SW4. A second terminal of the capacitor $C_{int}$ and a second switch terminal of the switch FET SW4 is coupled to the aforesaid signal ground.

A signal generated in operation at the first terminal of the capacitor $C_{int}$ is the signal $V_{hard}$ indicative of hard switching amplitude arising in the first primary switch FET SW1 described earlier. Moreover, the integrator 320 is operable to provide a Laplacian transfer function as defined in Equation 2 (Eq. 2):

$$V_{hard} = \left[\left(\frac{1}{sC_{int}}\right)k_1 DVDT\right] + k_0 \qquad \text{Eq. 2}$$

where $k_1$, $k_0$ are operating constants of the integrator 320.

Combining Equations 1 and 2 yields an overall Laplacian transfer function as provided in Equation 3 (Eq. 3):

$$V_{hard} = \left[\left(\frac{1}{sC_{int}}\right)k_1\left[\frac{sR_dC_d}{(1+sR_dC_d)}\right]V_{sec}\right] + k_0 \qquad \text{Eq. 3}$$

By appropriate temporal switching which will be described later, significance of the terms $sR_dC_d$ relative to unity (1) in the denominator of Equations 1 and 3 are susceptible to being used to derive a measure of the hard switching amplitude of the primary switch FET SW1.

The control unit 330 includes an input capacitor $C_c$ which is connected at its first terminal to the $V_{sec}$ signal output of the first secondary winding $L_{sec1}$, and at its second terminal to a first terminal of a resistor $R_c$, to a first switch terminal of an analog switch FET SW5 and to the $V_{hard}$ output indicative in operation of hard switching amplitude. Moreover, a second terminal of the resistor $R_c$ and a second switch terminal of the switch FET SW5 are coupled to the aforesaid signal ground, as illustrated. Furthermore, the HSE input is coupled via a logic inverter 340 to a switching control input of the switch FET SW5 as shown. A signal developed at the first terminal of the resistor $R_c$ is coupled into a comparator 350 configured, with additional components if required (not shown), to exhibit a hysteresis characteristic to generate the aforementioned signals DISDIF and DISINT.

In FIG. 5, it will be appreciated that the hard switching amplitude detector 300 is shown coupled to the SMPS 10 but is also suitable for connected to other types of electronic switching circuits, for example switch mode motor control circuits suitable for applying power to switched-reluctance motors, traction assemblies such as conveyor belts, battery chargers, fluorescent lighting devices, high voltage ionizers, ionizing water purifiers and linear actuators to mention just a few examples.

Figure 6:
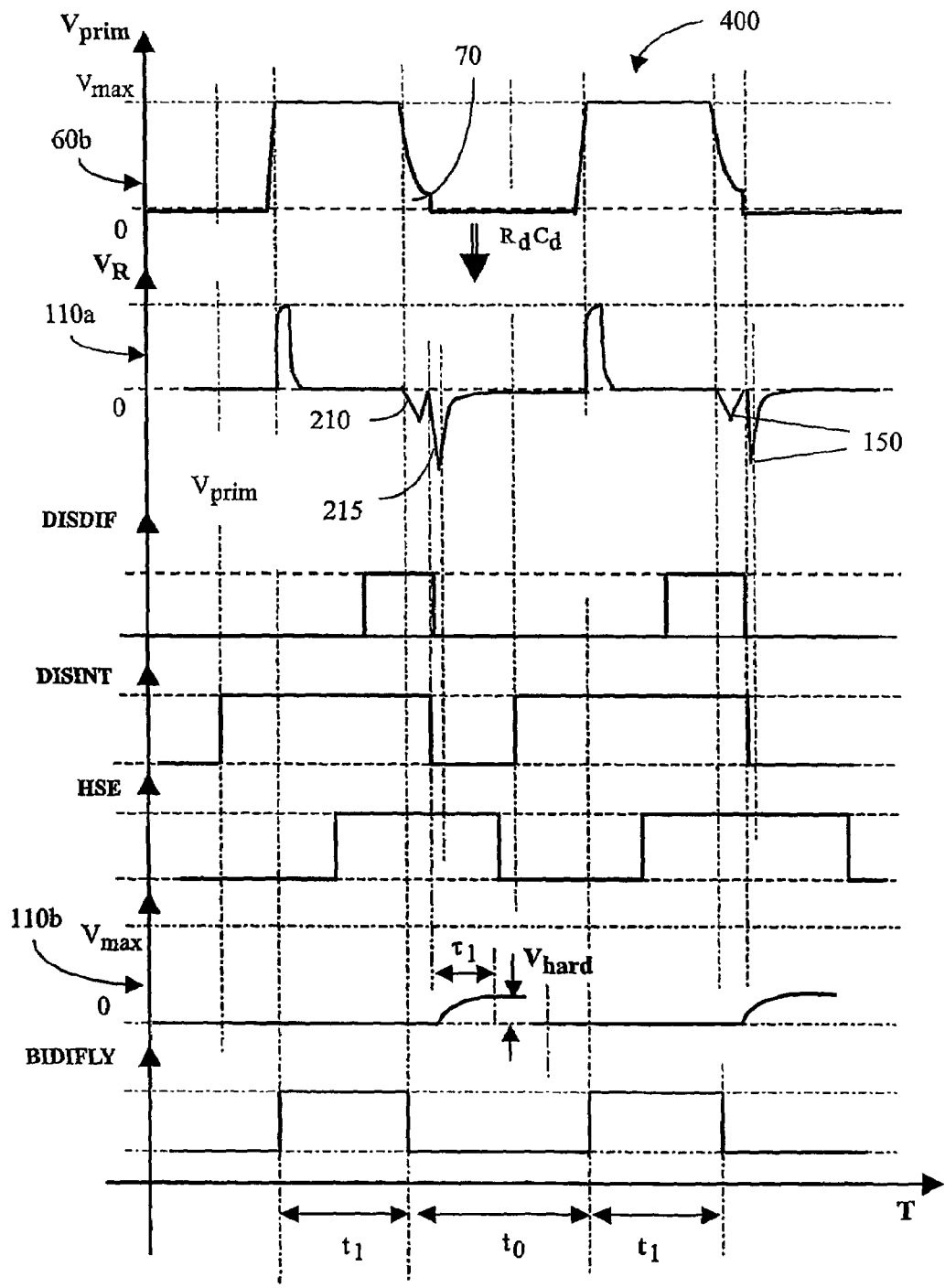
FIG. 6 is a temporal switching diagram pertaining to the embodiment illustrated in FIG. 5.

In order to describe operation of the detector 300, FIG. 6 will also be referred to in conjunction with FIG. 5. In the first method implemented in the detector 300 of FIG. 5, a downward conducting stroke of the primary switch FET SW1 generates the aforementioned peaks 150 as illustrated. The HSE signal is arranged to remain in an on state for a period including the peaks 150 and time there around. The differentiator 310 is disabled by way of its switch FET SW3 shorting the resistor $R_d$ in response to the DISDIF signal from the control unit 330 for a period including the peak 210 but excluding its subsequent peak 215. Likewise, the integrator 320 is similarly disabled by way of its switch FET SW4 shorting the capacitor $C_{int}$ in response to the signal DISINT as illustrated, such disablement including a period of the primary upward stroke of the primary switch FET SW1. As a consequence, the peak 210 is susceptible to providing precise timing information, whereas the peak 215 includes information relevant for deriving a measure of the hard switching amplitude $V_{hard}$. For each switching cycle of the primary switch FET SW1, the detector 300 is capable of measuring the hard switching amplitude $V_{hard}$ and providing a corresponding output from the detector 300.

Thus, the control unit 330 is operable to sense the signal $V_{sec}$ and generate the DISINT, DISDIV signals therefrom by way of action of the hysteresis comparator 350. The HSE signal is operable to disable a second differentiator formed by the resistor $R_d$ and its associated capacitor $C_c$, thereby preventing the DVDT signal provided to the integrator 320 from disturbance outside a time window wherein hard switching is expected. However, inclusion of the DISIT signal is not essential for the invention. At a moment that a hard switch moment is detected, the DISINT signals is set to a logic OFF state and integration of an effective area under the DVDT signal starts.

The detector 300 is also susceptible to being operated in the aforementioned second method M2, wherein resetting of the differentiator 310 is required. As illustrated in FIG. 4, the integrator 320 is switched by way of the control unit 330 coupled by the output DISINT to the switch FET SW4. In the second method M2, integration of the output of the differentiator 310 occurs through the period $\tau_2$ encompassing upward strokes and corresponding subsequent downward strokes of the of the primary switch FET SW1 as illustrated but excluding contribution from any hard-switching transient.

Finally, the BIDIFLY signal indicates when the switch SW2 is ON and OFF.

It will be appreciated that embodiments of the invention described in the foregoing are susceptible to modification without departing from the scope of the invention. For example, although the generation of an imperfect integrator and/or an imperfect differentiator using one or more capacitive components connected in combination with one or more resistive components is described, it will be appreciated that one of more resistive components connected in combination with one or more inductive components may be employed as an alternative configuration for achieving imperfect integration and/or differentiation.

The detector 300, either implemented using analog components in an analog manner or in a digital manner using one or more of digital components and software, or a mixture of these manners, is capable of being applied to a wide range of switch mode circuits for deriving a measure of hard switching amplitude occurring therein. This amplitude can be employed to control potentially several different functions such as overload shutdown, regulation, and switching in of other circuits and subsystems.

In the foregoing, it will be appreciated that the singular is also intended to include the plural. Similarly, expressions such as "include", "contain", "comprise", "have" are intended to be construed as non-exclusive, namely to allow for the presence of other items.

In the claims, any reference signs placed between parentheses shall not be construed as limiting the claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A switch mode power supply circuit including at least one inductive component coupled to an associated switch for cyclically connecting the inductive component to a source of power, the circuit including a signal output representative of a voltage at a junction of the at least one inductive component to the associated switch, the circuit further comprising a hard switching amplitude detector for deriving a measure of hard switching amplitude occurring in operation in the associated switch, the detector including a signal processing path for receiving the signal output and generating the measure of hard switching amplitude therefrom, the signal path including:

a signal differentiator circuit for imperfectly differentiating the signal output to generate a corresponding imperfectly differentiated signal; and a signal integrator circuit for integrating the imperfectly differentiated signal in a temporally-gated manner for generating the measure of hard switching.

2. A circuit according to claim 1, wherein the detector further includes a timing circuit for applying temporal gating to the integrator circuit.

3. A circuit according to claim 2, wherein the timing circuit is arranged to provide temporal gating to the differentiator circuit.

4. A circuit according to claim 2, wherein the timing circuit is arranged to reset at least one of the differentiator circuit and the integrator circuit for each conduction cycle of the associated switch.

5. A circuit according to claim 1, wherein each conduction cycle of the associated switch has associated therewith, in operation:

a downward stroke whereat the associated switch switches from a non-conductive state to a conductive state; and an upward stroke whereat the associated switch switches from a conductive state to a non-conductive state, the detector being arranged so as to be capable of imperfectly differentiating and subsequently integrating the output signal in a period commencing shortly prior to the upward stroke and ending shortly after completion of the downward stroke of each cycle for deriving the measure of hard switching amplitude during that cycle.

6. A circuit according to claim 1, wherein each conduction cycle of the associated switch has associated therewith, in operation:

a downward stroke whereat the associated switch switches from a non-conductive state to a conductive state;

and an upward stroke whereat the associated switch switches from a conductive state to a non-conductive state, the detector being arranged so as to be capable of imperfectly differentiating and subsequently integrating the output signal in a period;

commencing from the end of a first differential signal peak arising from the downward stroke of each cycle to include a subsequent second differential signal peak arising within the cycle after the first peaks; and ending within or after the second differential signal peak, for deriving the measure of hard switching amplitude during that cycle.

7. A circuit according to claim 1, wherein the differentiator circuit is implemented as a potential divider combination of a resistor and an associated capacitor, the resistor and capacitor defining an associated time constant capable of rendering the combination susceptible to providing imperfect differentiation of the signal output suitable for use in generating the measure of hard switching amplitude.

8. A circuit according to claim 1, wherein the differentiator circuit is implemented as a potential divider combination of a resistor and an associated inductor, the resistor and inductor defining an associated time constant capable of rendering the combination susceptible to providing imperfect differentiation of the signal output suitable for use in generating the measure of hard switching amplitude.

9. A circuit according to claim 1, the circuit adapted for incorporation in at least one of: switch mode power supplies, motor controllers, battery chargers, ionizing apparatus, high tension bias generators.

10. A method of generating a measure of hard switching amplitude in a switch mode power supply circuit, the circuit including at least one inductive component coupled to an associated switch for cyclically connecting the inductive component to a source of power, the circuit including a signal output representative of a voltage at a junction of the at least one inductive component to the associated switch, the method including the steps of:

(a) providing the circuit with a hard switching amplitude detector for deriving the measure of hard switching amplitude occurring in operation in the associated switch, the detector including a signal processing path for receiving the signal output and generating the measure of hard switching amplitude therefrom;

(b) imperfectly differentiating the signal output using a signal differentiator circuit included in the signal path for generating a corresponding imperfectly differentiated signal; and (c) integrating the imperfectly differentiated signal in a temporally-gated manner in a signal integration circuit included in the signal path for generating the measure of hard switching.

11. A switch mode power supply circuit comprising:
a transformer that includes a primary winding electrically isolated from a secondary winding;
a primary switch for cyclically connecting the primary winding to a power source;
a signal output representative of a primary voltage at a junction of the primary winding to the primary switch; and
a hard switching amplitude detector connected at a junction of the secondary winding to a secondary switch, the hard switching amplitude detector including a signal processing path for receiving the signal output and for generating a measure of hard switching amplitude occurring in operation of the primary switch, the signal path including a signal differentiator circuit for imperfectly differentiating the signal output to generate a corresponding imperfectly differentiated signal, a signal integrator circuit for integrating the imperfectly differentiated signal in a temporally-gated manner for generating the measure of hard switching, and a control unit to provide gating signals to the signal differentiator circuit and the signal integrator circuit.

12. The circuit according to claim 11, wherein the control unit is provided with an input signal indicative of a time interval in which hard switching is expected.

13. The circuit according to claim 11, wherein the signal integrator circuit integrates the imperfectly differentiated signal for a period initiated upon detection of a switching peak derived from decay in the primary voltage due to a parasitic capacitance in the primary switch.

* * * * *